United States Patent
Taylor

[15] 3,666,209
[45] May 30, 1972

[54] V/STOL AIRCRAFT WITH VARIABLE TILT WING

[72] Inventor: Frederick M. Taylor, Seattle, Wash.
[73] Assignee: The Boeing Company, Seattle, Wash.
[22] Filed: Feb. 24, 1970
[21] Appl. No.: 13,422

[52] U.S. Cl. ..................................244/7C, 244/12 A
[51] Int. Cl. ........................................B64c 27/28
[58] Field of Search ..................244/7 R, 7 A, 7 C, 12 A

[56] References Cited

UNITED STATES PATENTS

| | | | |
|---|---|---|---|
| 3,478,988 | 11/1969 | Roed | 244/42 DA |
| 3,545,701 | 12/1970 | Bertin | 244/12 B |
| 3,430,894 | 3/1969 | Strand et al. | 244/12 A |
| 3,410,506 | 11/1968 | Hayes | 244/7 R |
| 3,136,499 | 6/1964 | Kessler | 244/7 C |

Primary Examiner—Duane A. Reger
Attorney—Glenn Orlob and Theron H. Nichols

[57] ABSTRACT

V/Stol aircraft wiring comprising two independently rotatable fore and aft portions, both portions being movable in any position from the horizontal to the vertical positions for the most aerodynamically efficient configuration for take-off either conventional or vertical, for climb, for landing either conventional or vertical, and for braking either in the air or while taxiing on the ground.

5 Claims, 15 Drawing Figures

INVENTOR.
FREDERICK M. TAYLOR
BY
Theron H. Nichols
AGENT

INVENTOR.
FREDERICK M. TAYLOR
BY
Theron H. Nichols
AGENT 3,666,209

1

V/STOL AIRCRAFT WITH VARIABLE TILT WING

SUMMARY OF THE INVENTION

V/STOL aircraft having a wing comprising two, independently rotatably portions, both portions being rotatable to a horizontal position parallel to the longitudinal axis of the aircraft fuselage to form a single composite and streamlined wing for cruise flight and being rotatable to any position between horizontal and vertical positions for various flight and ground maneuvers. Both wing portions or a single portion may be tilted for additional lift, or for take-off, and only the aft portion may be rotated to the vertical position on the ground for braking during ground roll.

Accordingly, a primary object of this invention is to provide a superior wing for an aircraft having two independently rotatable portions for rotating between a horizontal position for level or cruise flight and a vertical position for vertical flight.

Another primary object of this invention is to provide a V/STOL aircraft with a wing that comprises two independently rotatable fore and aft portions wherein in level or cruise flight the leading edge of the aft portion overlaps the trailing edge of the fore portion for forming a highly efficient single lifting wing and yet can rotate to a vertical position for vertical flight.

Another object of this invention is to provide a V/STOL aircraft two portion wing that has a propulsion system on the fore wing portion for rotating between a horizontal flight position and a vertical flight position.

A further object of this invention is to provide a V/STOL aircraft two portion wing in which either one or both wing portions may be rotated at a tilted angle for various flight maneuvers, as climbing or letting down in a landing approach.

Another object of this invention is to provide a V/STOL two portion wing in which the aft wing portion is rotatable to the vertical position for braking during landing roll.

A still further object of this invention is to provide a V/STOL two portion wing in which one or both of the wing portions comprise a plurality of interconnected segments for being adjustable to the desired aerodynamic configuration.

BRIEF DESCRIPTION OF THE DRAWINGS

The drawings diagrammatically illustrate by way of example, not by way of limitation, several forms of the invention wherein like reference numerals designate corresponding parts in the several views in which.

DESCRIPTION OF THE PREFERRED EMBODIMENTS

The invention, the scope of which being defined in the appended claims, is not limited in this application to the details of construction and arrangement of parts shown and described, since the invention is capable of other embodiments and of being practiced or carried out in various other ways. Also, it is to be understood that the phraseology or terminology employed herein is for the purpose of description and not of limitation.

The variable tilt airfoil described hereinafter provides a wing which facilitates vertical take-offs and landings, lift augmentation for conventional take-offs and landings and improved ground roll braking by rotating a portion of the wing to the vertical position.

Figure 1:
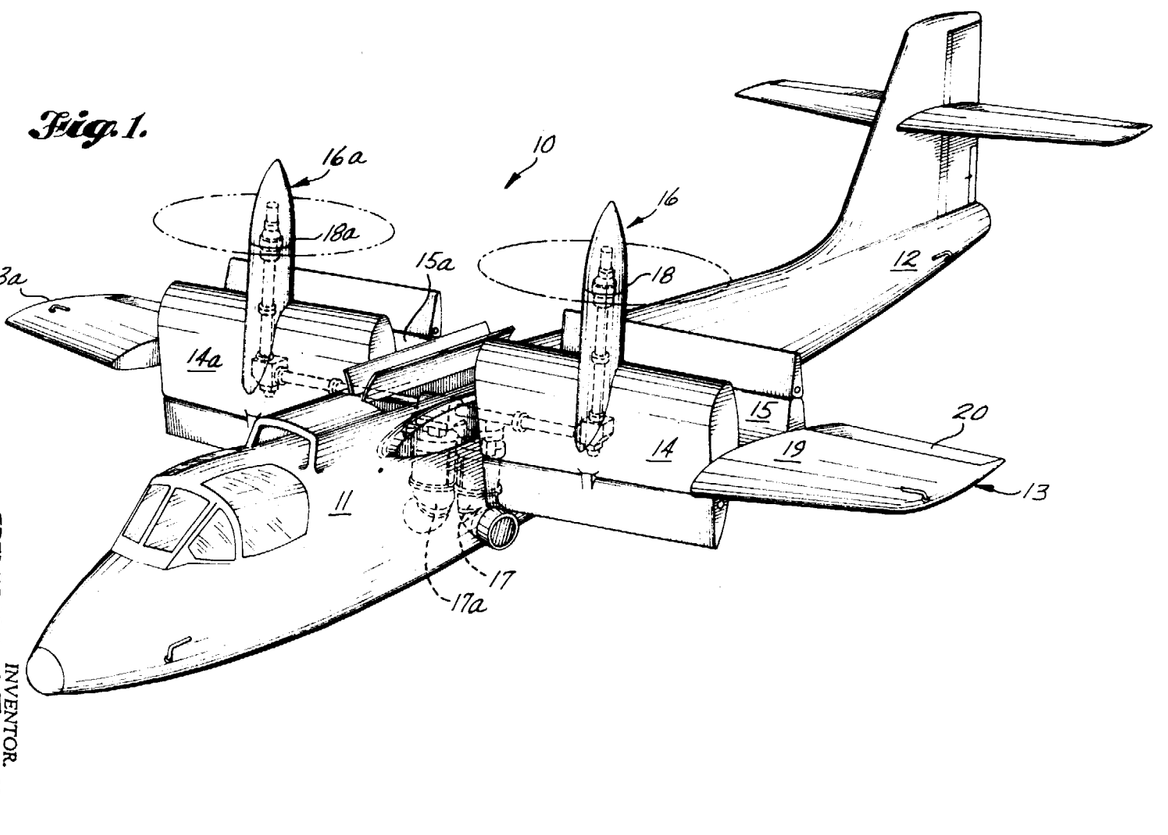
FIG. 1 is a schematic view in perspective of a VTOL aircraft with the variable tilt airfoil illustrated in vertical flight configuration.

FIG. 1 illustrates a typical V/STOL aircraft 10. This aircraft 10 comprises a conventional fuselage 11 with a conventional tail 12 and allochiral wings 13 and 13a. Wing 13, for example, comprises two, fore and aft portions 14 and 15 and right wing 13a comprises fore and aft portions 14a and 15a. The aircraft propulsion means 16 comprises a jet engine 17 mounted in the fuselage 11 and prop gear train 18 fixedly mounted on the forward wing portion 14. Right wing 13a likewise has its propulsion means 16a comprising jet engine 17a and prop gear train 18a. Any suitable pilot controlled actuating mechanism is included in the fuselage 11 for rotating wing portions 14 and 15 to the various positions in the 90° of motion illustrated hereinafter. An airfoil 19 with ailerons 10 is fixed to the ends of wing spars (not shown in FIG. 1).

Figure 2:
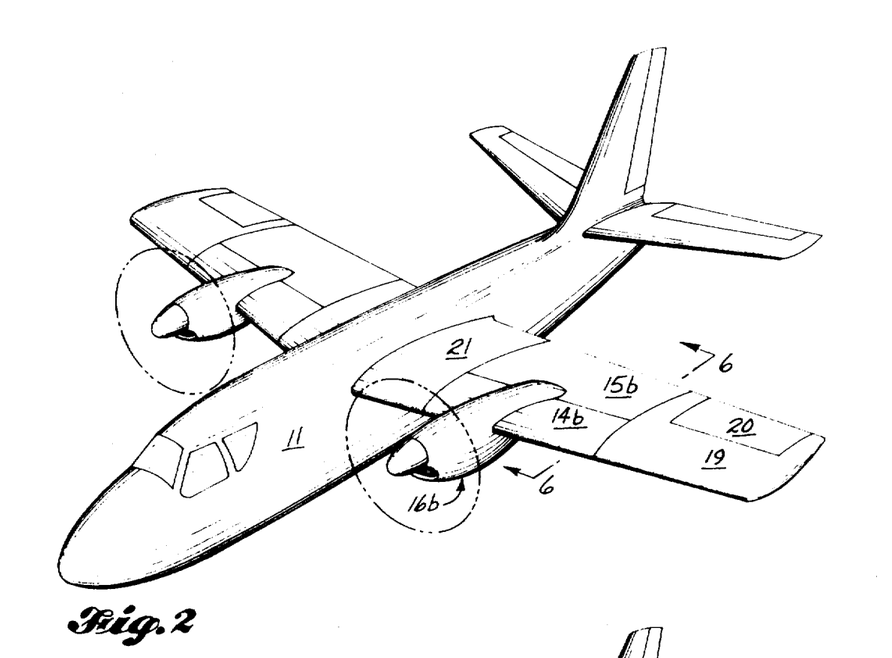
FIG. 2 is a schematic perspective view of a modification of the VTOL aircraft of FIG. 1, illustrated in cruise configuration.

FIG. 2 illustrates a modification of the V/STOL aircraft of FIG. 1, wherein the wings are shown rotated to the cruise or horizontal flight position. In this modification the lateral control system or ailerons 20 are mounted on fixed airfoils 19 outboard of the wing fore and aft portions 14 and 15. Likewise, a fixed airfoil section 21 is positioned between the rotatable wing portions and the fuselage.

Figure 3:
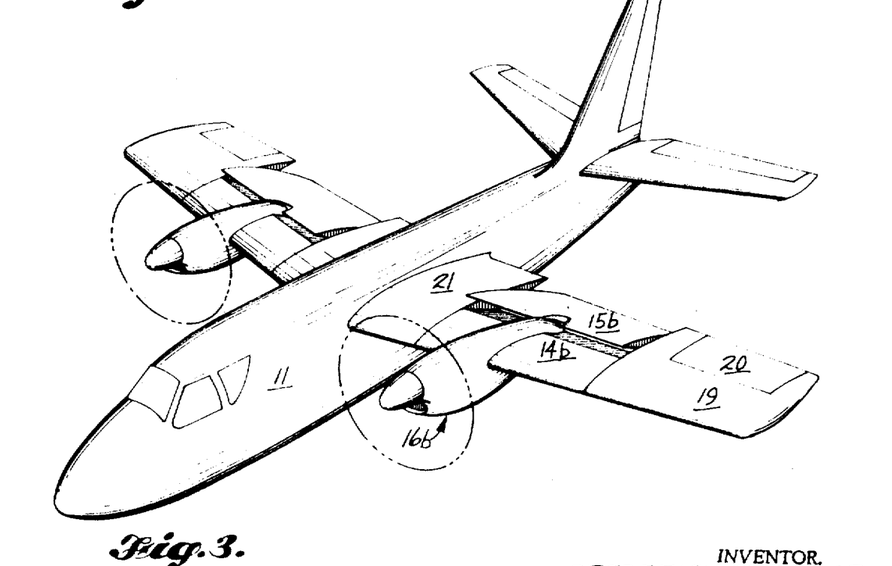
FIG. 3 is a schematic view in perspective of the VTOL aircraft of FIG. 2 in conventional take-off or landing configuration.

FIG. 3 is a schematic perspective view of the aircraft of FIG. 2 shown in climbing configuration wherein only the wing aft portion is illustrated as rotated slightly for increased lift.

Figure 4:
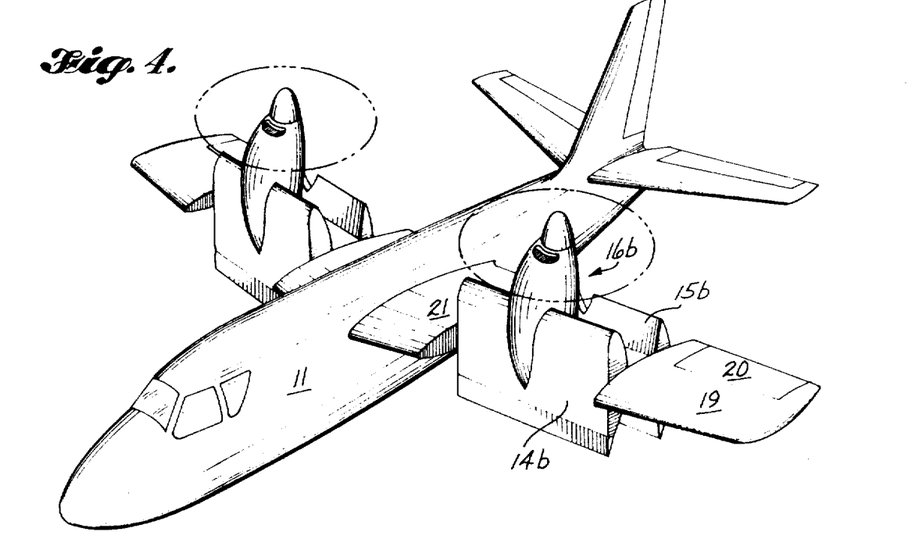
FIG. 4 is a schematic view in perspective of the VTOL aircraft of FIG. 2 in vertical flight configuration.

FIG. 4 is a perspective view of the aircraft of FIG. 2 shown with both fore and aft wing portions 14 and 15 of the aircraft rotated to the vertical position.

Figure 5:
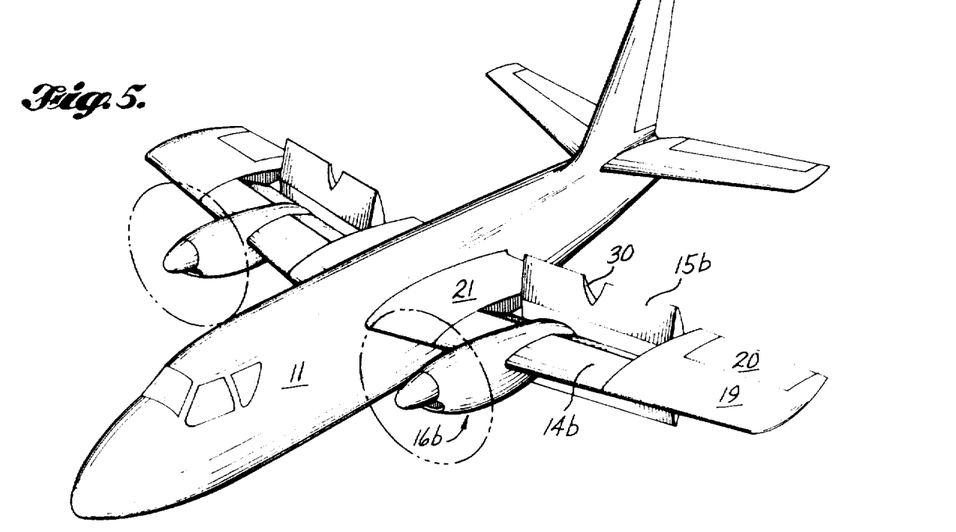
FIG. 5 is a schematic perspective view of the VTOL aircraft of FIG. 2 in an inflight or a landing roll braking configuration.

FIG. 5 is a view of the modification of FIG. 4 wherein the wing aft portion is positioned vertically for braking during a landing roll or for aerodynamic braking for fast let downs.

Figures 6, 7:
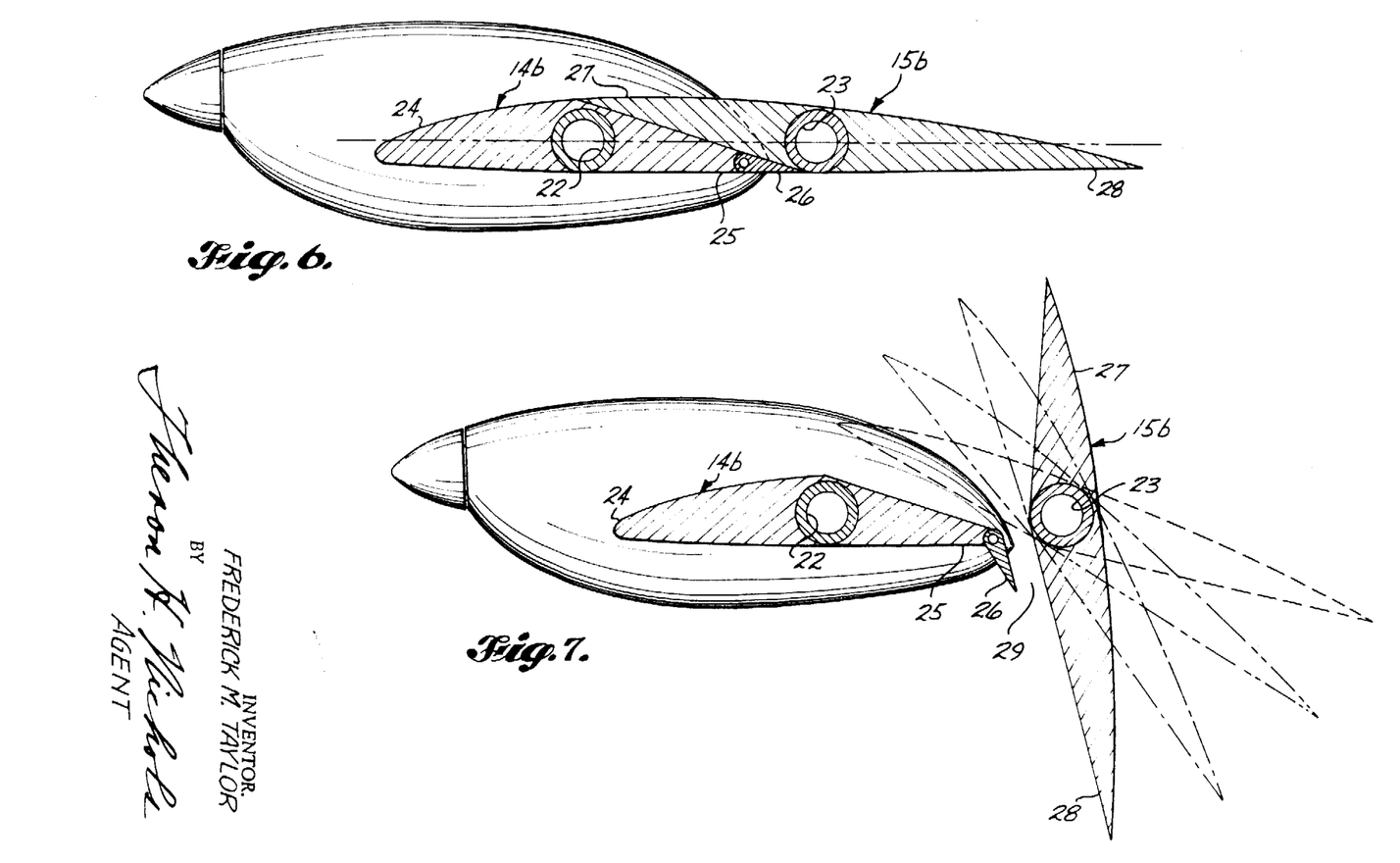
FIG. 6 is a detailed cross sectional view of the two, independently rotatable wing portions taken at 6—6 on FIG. 2.
FIG. 7 is a view of the variable tilt airfoil of FIG. 6 illustrating four basic positions beyond cruise position which the airfoil aft portion may assume.

FIG. 6, a detailed sectional view taken at 2—2 on FIG. 2 illustrates the novel cooperation between the fore and aft wing portions 14 and 15 mounted on fore and aft wing spars 22 and 23, respectively. Fore wing portion 14 rotatably mounted on fore spar 22 has leading edge part 24 and trailing edge part 25 having flap 26 rotatably mounted thereon. Wing aft portion 15 has leading edge part 27 and trailing part 28. As illustrated in the cruise position, leading edge part 27 of the wing aft portion 15 overlies the trailing edge part 25 and flap 26 of the wing fore portion 14 to form a very efficient and streamlined single lifting high speed wing.

As described above, suitable actuators (not shown) are mounted in the aircraft for rotating each of wing portions 14b and 15b about fore and aft wing spars 22 and 23, respectively.

FIG. 7, a sectional view of the wing of FIG. 6, shows the aft wing portion 15b rotatable in four different positions, for example, beyond the horizontal, the vertical position being shown in sectional lines and the other intermediate position being shown in broken lines. Likewise, in all positions of the aft wing portion beyond the horizontal position, a slot 29 is formed between the two wing portions. This slot 29 is closed or opened by controllable flap 26 described above in relation to FIG. 6.

Figure 8:
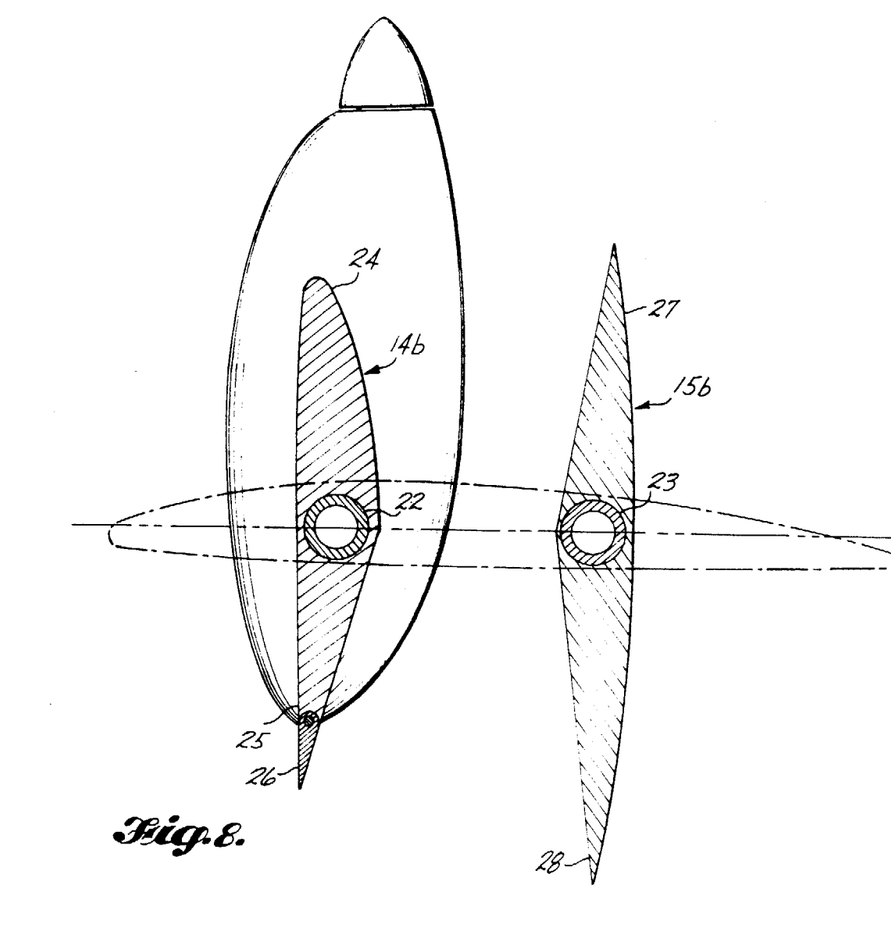
FIG. 8 is the two, independently rotatable wing portions of FIG. 6 rotated to the vertical flight configuration.

FIG. 8 is another detail view of the FIG. 6 embodiment where both the fore and aft wing portions are rotated to the vertical position. The broken line outline of the wing shows the horizontal position of the two wings when fitted together for horizontal flight.

Figure 9:
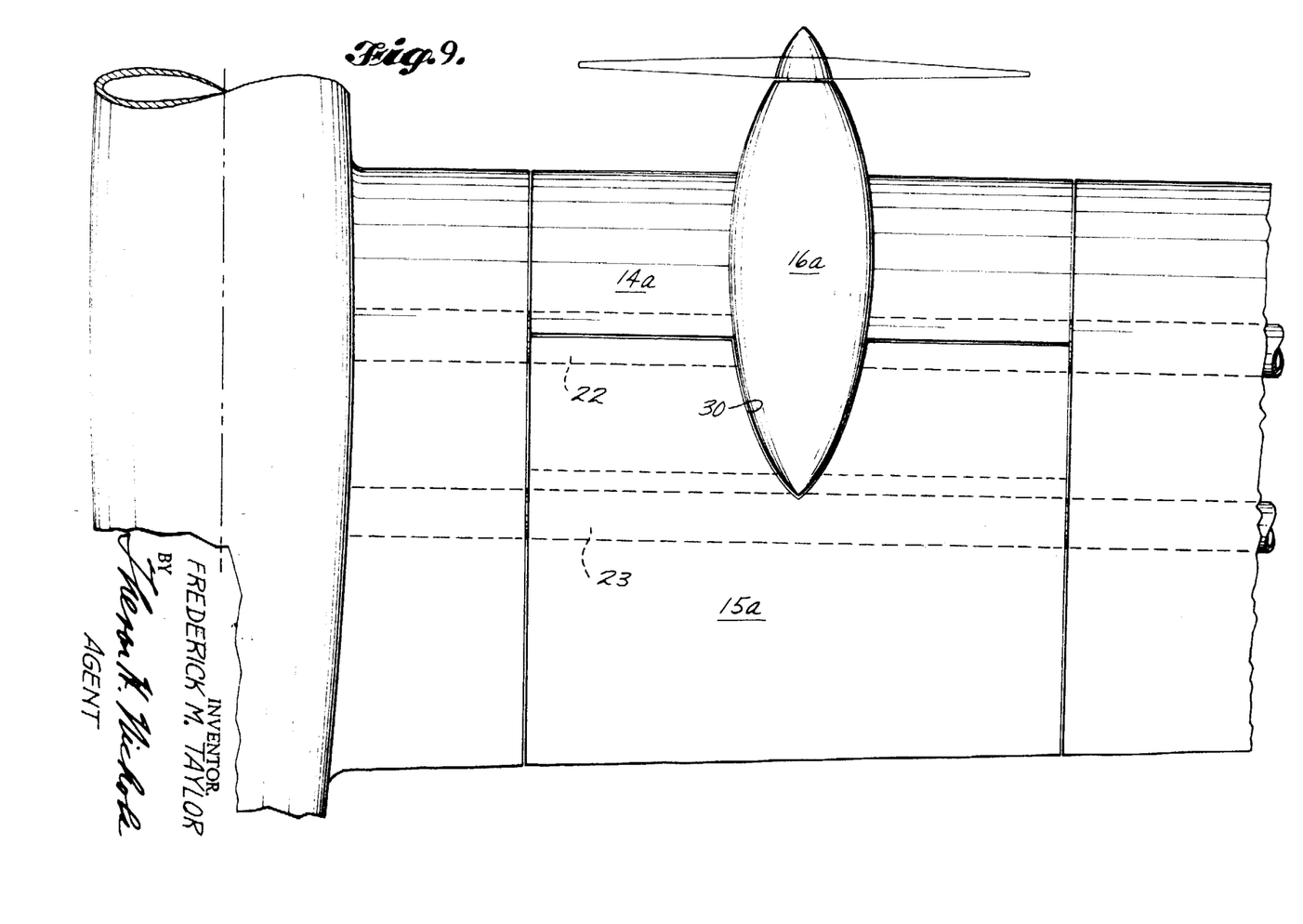
FIG. 9 is a top view of FIG. 6.

FIG. 9, a top view of the embodiment of FIG. 6, illustrates the engine or power means 16a which is connected to the fore wing portion 14a and extends rearwardly whereby a cutout 30 is formed in the leading edge of the aft wing portion.

Figure 10:
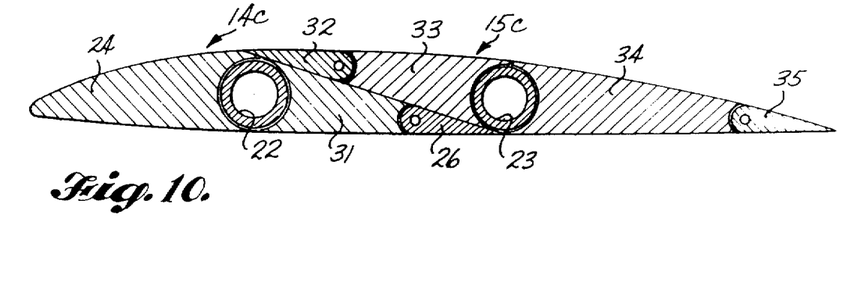
FIG. 10 is a schematic sectional view similar to FIG. 6, but of a modified segmented wing in cruise position.

FIG. 10, is another modification wherein the fore and aft wing portions are divided into segments, fore wing portion 14c comprising forward wing part 24 with a propulsion engine (not shown) mounted thereon and aft wing part 31 which is rotatable about fore wing spar 22. Pivotally connected to the aft wing part 31 is a flap 26. Aft wing portion 15c comprises forward leading edge flap 32 pivotally connected to pivotal segment 33 which in turn is pivotally mounted on wing rear spar 23. An aft pivotal part 34 is pivotally mounted for rotation about wing rear spar 23 and pivotally connected to the rearward end of segment 34 is trailing edge flap 35. Each segment of each of the two wing portions 14c and 15c are individually controllable and operable by conventional actuators controlled by the pilot.

Figure 11:
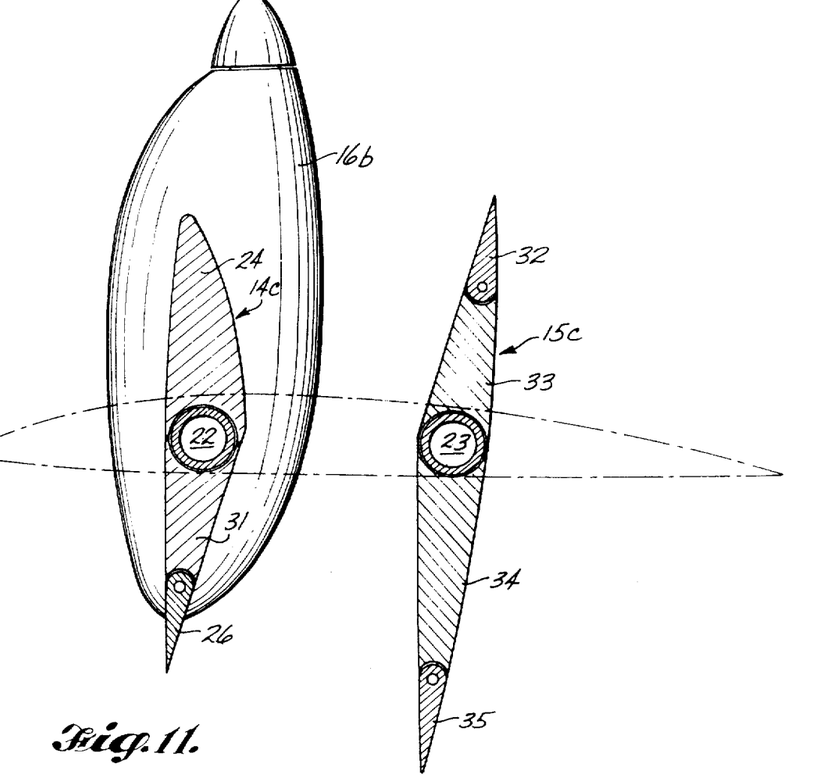
FIG. 11 is a sectional view of the modification of FIG. 10, rotated to the vertical flight configuration.

FIG. 11 shows both segmented wing portions 14c and 15c rotated to the vertical position for vertical flight, propulsion engine 16b being fixedly mounted on leading edge segment 24 of wing fore section 14c.

FIGS. 12-15 are schematic sectional views of the modification of FIG. 10 wherein various configurations that are possible are shown with the segmented fore and aft wing portions.

Figure 12:
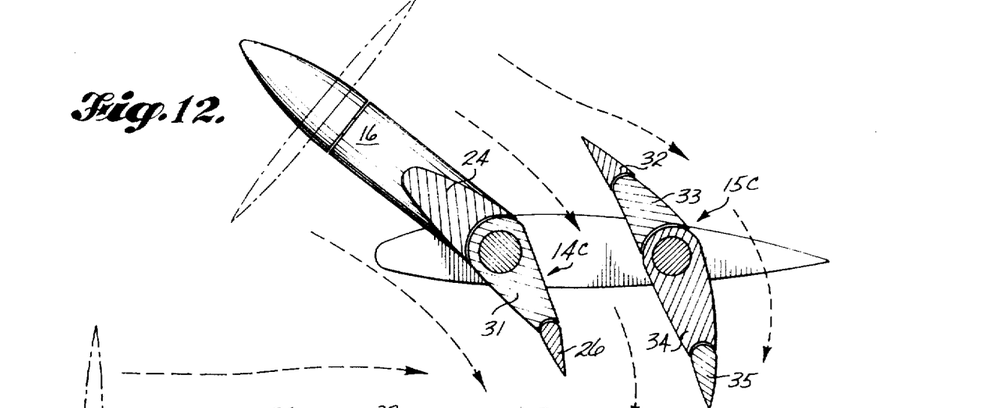
FIGS. 12 to 15 are schematic sectional views of the modification of FIG. 10 showing only a few of the various configurations possible with the segmented fore and aft wing portions.

In FIG. 12, fore segmented wing section 14c is shown wherein the segments 24, 31, and 26 are aligned for best aerodynamic flow for a very steep climb, leading edge segment 24 carrying the propulsion engine 16. Aft wing section 15c, including segments 32, 33, 34 and 35, are aligned also for best aerodynamic flow for a steep climb as combined with the fore wing section.

Figure 13:
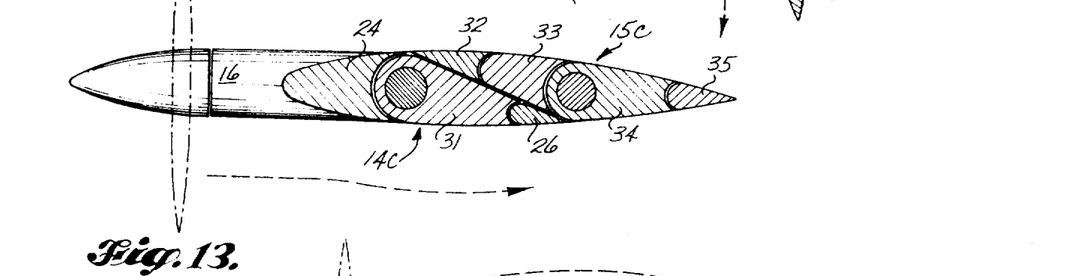

FIG. 13 shows the segmented wing portions 14c and 15c in alignment forming one continuous streamline horizontal wing.

Figures 14, 15:
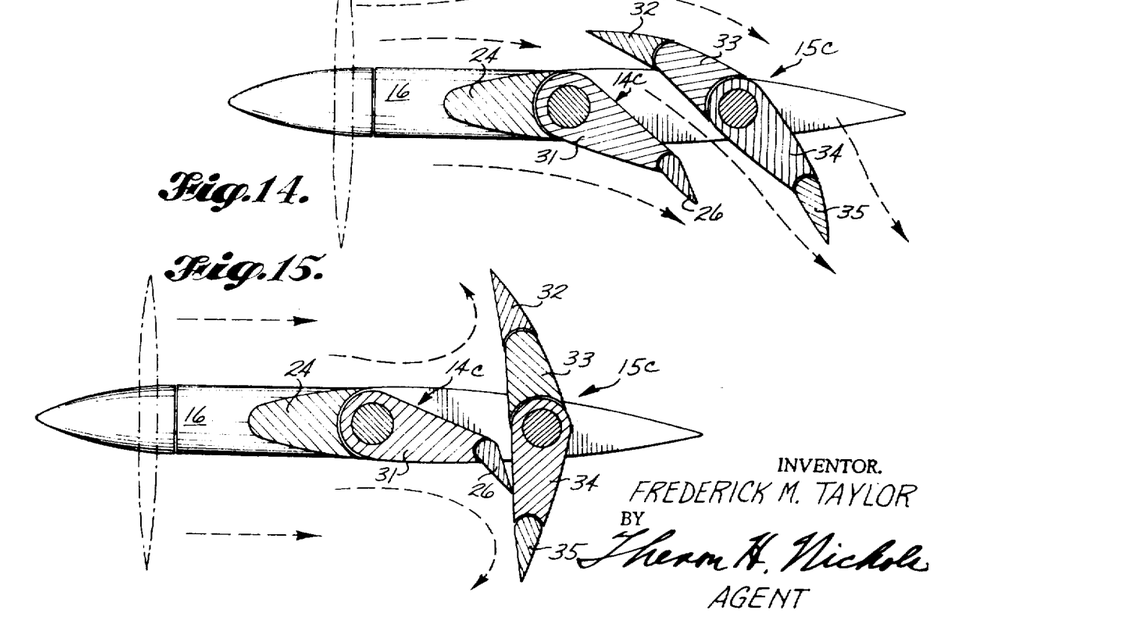

FIG. 14 shows the segmented wing portions 14c and 15c wherein all are curved in an arcuate manner for best aerodynamic air flow, or another high lift configuration.

FIG. 15 shows the segmented wing portions 14c and 15c with fore portion 14c in horizontal position and segmented aft portion 15c in vertical position for greatest or maximum aerodynamic flow for aerodynamic braking either in flight or on the ground.

In summary, a new V/STOL aircraft has been disclosed having two independently rotatable portions forming the wing which rotate between a horizontal position for level or cruise flight and a vertical position for vertical flight. Likewise, this aircraft with the two fore and aft wing portions also forms a highly efficient single lifting wing when rotated to the horizontal position. In this two portion wing also, the aft portion may be rotated to the vertical position for braking during either a landing roll or aerodynamic braking while flying in the air. Likewise is shown an aircraft having a wing in which the complete wing is divided into independently movable portions or a wing in which one or more portions of it are fixed airfoils interconnecting the wing spars. Also, the wing of an aircraft is disclosed in which the two portions are divided into segments. One embodiment FIG. 1 has a wider fixed airfoil at the tip and another embodiment FIGS. 2 and 3 have, additionally, a fixed airfoil inboard of the two wing portions.

Thus it may be seen that the disclosed two independently rotatable fore and aft wing portions provide a variable lift wing for a V/STOL aircraft in a manner which meets each of the objects set forth above.

What is claimed is:

1. An aircraft having V/STOL capability with a fuselage and wing, said wing comprising: an inboard spanwise wing section having its aerodynamic composite airfoil section divided chordwise into a fore and an aft tilt-wing portion; said fore tilt-wing portion being pivotally mounted to the fuselage for rotation with respect to the fuselage about a first spanwise axis; said fore tilt-wing portion having a leading edge part mounted on a wing spar axially aligned with said first spanwise axis, said leading edge part having a trailing edge part with a flap rotatably mounted thereon for varying the airfoil camber of said fore tilt-wing portion; said aft tilt-wing portion being pivotally mounted to the fuselage for rotation with respect to the fuselage about a second spanwise axis which is in parallel alignment with said first spanwise axis and displaced chordwise aft of said first spanwise axis; said aft tilt-wing portion being mounted on a wing spar axially aligned with said second spanwise axis for independent rotation with respect to both said fore tilt-wing portion and said fuselage; propeller propulsion means fixedly mounted on said fore tilt-wing portion of the inboard spanwise wing section and tiltable in unison therewith about said first spanwise axis for moving the aircraft forwardly when said fore tilt-wing portion is in the horizontal position and moving the aircraft vertically when said fore tilt-wing portion is rotated to the vertical position; each of said fore and aft tilt-wing portions being independently movable to various positions from a horizontal position substantially parallel to the fuselage longitudinal axis for forward cruise flight, to a vertical position substantially perpendicular to said fuselage longitudinal axis for vertical flight; an outboard spanwise fixed wing portion fixedly mounted to the wing spars of the fore and aft tilt-wing portions and positioned outside of the slipstream of said propeller propulsion means mounted to the inboard spanwise tilt-wing sections, for producing an aerodynamic lifting force during transition flight of the aircraft from a vertical flight condition to forward cruise flight; and lateral control system ailerons pivotally mounted on said fixed wing portions for producing lateral control during transition and forward flight.

2. An aircraft as recited in claim 1, wherein, said fore portion having the propeller propulsion means mounted thereon is positioned at said horizontal position and said aft portion is rotated relative to said fore portion to said vertical position for deflecting the propeller slipstream normal to the longitudinal axis of the fuselage and provide aerodynamic braking.

3. An aircraft as recited in claim 1, wherein, said fore and aft portions have a leading and trailing edge; and when said fore and aft portions are rotated to said horizontal position they are in abutment relation forming a substantially continuous upper and lower surface with the leading edge of said aft portion overlapping the trailing edge of said fore portion for forming a single composite airfoil section.

4. An aircraft as recited in claim 1, further including: a trailing edge movably mounted on said fore portion; and when said aft portion is rotated relative to said fore portion so as to form a slot therebetween, the trailing edge is positionable to open and close said slot for control of the air flow through chordwise composite wing of the aircraft.

5. An aircraft as recited in claim 1, wherein, said fore and aft portions comprise a series of chordwise segments movably interconnected and positionable to vary the curvature of the upper surface of said fore and aft portions to the desired aerodynamic configuration for V/STOL capability.

* * * * *